United States Patent [19]
Kanda

[11] Patent Number: 5,906,360
[45] Date of Patent: May 25, 1999

[54] ELASTIC MOUNTING DEVICE INCLUDING FLUID-FILLED ELASTIC MOUNT AND SYNTHETIC RESIN BRACKET FOR FIXING THE ELASTIC MOUNT, AND METHOD OF MANUFACTURING THE SAME

[75] Inventor: Ryouji Kanda, Komaki, Japan

[73] Assignee: Tokai Rubber Industries, Ltd., Japan

[21] Appl. No.: 08/908,808

[22] Filed: Aug. 8, 1997

[51] Int. Cl.⁶ ............................. F16F 9/16; F16F 13/14; B60K 5/12
[52] U.S. Cl. ................. 267/140.12; 29/446; 29/897.2; 267/140.2; 267/219
[58] Field of Search ........................ 267/140.12, 219, 267/140.2, 140.11, 140.13, 220, 141.2–141.7; 29/897.2, 417, 450, 436, 446, 508, 898.09; 248/562, 636, 638, 575, 578; 180/312, 902, 300; 264/261, 275

[56] References Cited

U.S. PATENT DOCUMENTS

| | | | |
|---|---|---|---|
| 4,687,188 | 8/1987 | Knurek et al. | 267/140.11 |
| 4,998,345 | 3/1991 | Funahashi et al. | 29/897.2 |
| 5,088,700 | 2/1992 | Kanda et al. | 267/219 |
| 5,152,510 | 10/1992 | Komabashiri | 267/141.2 |
| 5,181,698 | 1/1993 | Fiene et al. | 267/140.12 |
| 5,183,243 | 2/1993 | Matsumoto | 267/140.13 |
| 5,240,233 | 8/1993 | Kato et al. | 267/219 |
| 5,249,782 | 10/1993 | Ide et al. | 267/219 |
| 5,333,846 | 8/1994 | Goto et al. | 267/140.14 |
| 5,671,908 | 9/1997 | Kato | 267/140.12 |

FOREIGN PATENT DOCUMENTS

| | | |
|---|---|---|
| 0 641 954 A1 | 3/1995 | European Pat. Off. . |
| 36 17 787 A1 | 11/1986 | Germany . |
| 41 40 854 A1 | 7/1992 | Germany . |
| 4-54334 | 2/1992 | Japan . |
| 7-158687 | 6/1995 | Japan . |

OTHER PUBLICATIONS

Patent Abstracts of Japan, vol. 97, No. 10, Oct. 31, 1997 & JP 09 170642 A (Kurashiki Kako), Jun. 30, 1997 *abstract*.
Patent Abstracts of Japan, vol. 97, No. 3, Mar. 31, 1997 & JP 08 285004 A (Bridgestone), Nov. 1, 1996 *abstract; figures 1–5, 10*.
Patent Abstracts of Japan, vol. 96, No. 9, Sep. 30, 1996 & JP 08 135718 A (Bridgestone), *abstract; figures*.

*Primary Examiner*—Douglas C. Butler
*Attorney, Agent, or Firm*—Parkhurst & Wendel

[57] ABSTRACT

Mounting device including a fluid-filled cylindrical elastic mount, and a synthetic resin bracket having a cylindrical bore in which the elastic mount is fixed, wherein the elastic mount includes a shaft member, an intermediate sleeve disposed radially outwardly of the shaft member and having a window, an elastic body connecting the shaft member and the intermediate sleeve and having a pocket open in the outer circumferential surface of the intermediate sleeve through the window, and an outer sleeve fitted on the intermediate sleeve through a sealing rubber layer to fluid-tightly close the window, for forming a fluid chamber filled with a non-compressible fluid, and wherein the sealing rubber layer is compressed by a compressive force generated based on a pressure of injection of the synthetic resin of the bracket into a mold when the bracket is formed in the mold, in contact with the outer circumferential surface of the outer sleeve, and is thereby fitted on the elastic mount upon formation of the bracket in the mold.

12 Claims, 8 Drawing Sheets

ELASTIC MOUNTING DEVICE INCLUDING FLUID-FILLED ELASTIC MOUNT AND SYNTHETIC RESIN BRACKET FOR FIXING THE ELASTIC MOUNT, AND METHOD OF MANUFACTURING THE SAME

BACKGROUND OF THE INVENTION

1. Field of the Invention

The present invention relates in general to a fluid-filled cylindrical elastic mount adapted to provide a vibration damping effect based on flows of a fluid contained therein, and a method of manufacturing such an elastic mount. More particularly, this invention is concerned with a mounting device including such a fluid-filled cylindrical elastic mount and a generally cylindrical bracket made of a synthetic resin, and a method of producing the same.

2. Discussion of the Related Art

As one type of a vibration damping mounting device interposed between two members of a vibration system, there is known a fluid-filled elastic mounting device including a fluid-filled cylindrical elastic mount, and a generally cylindrical bracket which is made of a synthetic resin and which has a cylindrical bore in which the fluid-filled cylindrical elastic mount is fixed. The fluid-filled cylindrical elastic mount includes: a center shaft member; an intermediate sleeve disposed radially outwardly of the center shaft member and having at least one window; an elastic body interposed between and connecting the center shaft member and the intermediate sleeve and having at least one pocket open in the outer circumferential surface of the intermediate sleeve through the corresponding window; and an outer sleeve which is fitted on the intermediate sleeve through a sealing rubber layer interposed therebetween, such that the above-indicated at least one window is fluid-tightly closed by the outer sleeve, so as to form at least one fluid chamber filled with a non-compressible fluid. The fluid-filled cylindrical elastic mount is fixedly accommodated in the cylindrical bore of the bracket such that the outer circumferential surface of the outer sleeve is in contact with the inner circumferential surface of the cylindrical bore.

Such as fluid-filled elastic mounting device constructed as described above is capable of exhibiting an excellent vibration damping effect and a sufficiently low dynamic spring constant, on the basis of flows of the fluid through the cylindrical elastic mount upon application of a vibrational load between the center shaft member and the outer sleeve. This mounting device is suitably used on automotive vehicles, as an engine mounting device, a body mounting device, a differential mounting device and a suspension bushing device, for example.

The fluid-filled elastic mounting device of the type described above is required to have an improved degree of fluid-tightness of the fluid chamber or chambers while maintaining simple construction and ease of manufacture, to assure increased durability, operating reliability and load resistance.

SUMMARY OF THE INVENTION

It Is therefore a first object of this invention to provide a fluid-filled elastic mounting device which is simple in construction and easy to manufacture and which has an improved degree of fluid-tightness of a fluid chamber or chambers.

A second object of the invention is to provide a method suitable for manufacturing such a fluid-filled elastic mounting device.

The first object indicated above may be achieved according to a first aspect of this invention, which provides a fluid-filled elastic mounting device including a fluid-filled cylindrical elastic mount, and a generally cylindrical bracket which is made of a synthetic resin and which has a cylindrical bore in which the fluid-filled cylindrical elastic mount is fixedly accommodated in the cylindrical bore, the fluid-filled cylindrical elastic mount comprising: (a) a center shaft member; (b) an intermediate sleeve which is disposed radially outwardly of the center shaft member and which has at least one window; (c) an elastic body which is interposed between and connects the center shaft member and the intermediate sleeve and which has at least one pocket open in an outer circumferential surface of the intermediate sleeve through the above-indicated at least one window; and (d) an outer sleeve which is fitted on the intermediate sleeve through a sealing rubber layer interposed therebetween, such that the above-indicated at least one window is fluid-tightly closed by the outer sleeve, so as to form at least one fluid chamber which is filled with a non-compressible fluid and which corresponds to each of the above-indicated at least one pocket, the fluid-filled cylindrical elastic mount being fixedly accommodated in the cylindrical bore of the bracket, with an outer circumferential surface of the outer sleeve being held in contact with an inner circumferential surface of the cylindrical bore, and wherein the sealing rubber layer is compressed by a compressive force which is generated based on a pressure of injection of the synthetic resin of the generally cylindrical bracket into a mold when the generally cylindrical bracket is formed in the mold, in contact with an outer circumferential surface of the outer sleeve, and is thereby fitted on the fluid-filled cylindrical elastic mount upon formation of the generally cylindrical bracket in the mold.

While the fluid-filled cylindrical elastic mount of the present fluid-filled elastic mounting device may have a single fluid chamber, the provision of two or more fluid chambers is desirable to enable the mounting device to exhibit a high vibration damping effect based on resonance of the non-compressible fluid which is forced to flow through an orifice passage or passages between the two or more fluid chambers upon application of a vibrational load between the center shaft member and the outer sleeve (bracket). Each fluid chamber may be filled with a commonly known non-compressible fluid. For increasing damping effect based on the resonance of the non-compressible fluid, however, it is preferred that the non-compressible fluid have a relatively low viscosity, for example, not higher than 0.1PA·a.

The compressive force based on the injection pressure of the synthetic resin of the generally cylindrical bracket may act on the sealing rubber layer, either directly with the inner circumferential surface of the bracket being held in pressing contact with the outer circumferential surface of the sealing rubber layer, or indirectly through a suitable member such as the outer sleeve having a relatively small wall thickness.

The outer sleeve may be formed of either a metallic material or a synthetic resin material. A suitable bonding agent may be applied to the outer circumferential surface of the outer sleeve before the bracket is formed in contact with the outer circumferential surface of the outer sleeve, so that the outer sleeve is bonded to the inner circumferential surface of the cylindrical bore of the bracket formed.

In the fluid-filled elastic mounting device of the present invention constructed as described above, the compressive force based on the pressure of injection of the synthetic resin of the bracket into the mold is effectively utilized to compress the sealing rubber layer for thereby improving the sealing or fluid tightness of the fluid-filled cylindrical elastic mount fixedly accommodated in the cylindrical bore of the bracket. The present mounting device does not require any exclusive member for improving the fluid tightness of the elastic mount.

Since a high degree of fluid tightness of the fluid chamber or chambers is obtained by the compressive force based on the injection pressure of the synthetic resin of the bracket during formation thereof, it is not necessary to effect a drawing operation on the outer sleeve fitted on the intermediate sleeve, for radially inwardly compressing the outer sleeve against the sealing rubber layer interposed between the outer and intermediate sleeves. Conventionally, the outer sleeve is radially inwardly compressed by using dies (e.g., eight dies) disposed around the circumference of the outer sleeve. Accordingly, the present fluid-filled elastic mounting device can be manufactured with relatively high efficiency.

Although the sealing rubber layer may be bonded to the inner circumferential surface of the outer sleeve, it is preferably bonded to the outer circumferential surface of the intermediate sleeve. Further, it is desirable to form the sealing rubber layer integrally with the elastic body, for simplifying the construction of the cylindrical elastic mount and improving the efficiency of its manufacture.

In a first preferred form of the present fluid-filled elastic mounting device, the generally cylindrical bracket includes an inward flange integrally formed at each of opposite axial end portions thereof, such that the inward flange extends from each axial end portion of the bracket in a radially inward direction of the bracket, and reaches an axial end face of the intermediate sleeve. In this form of the invention, the inward flange is held in pressing contact with an axial end face of the sealing rubber layer by the pressure of injection of the synthetic resin, to apply the compressive force to the sealing rubber layer.

In the above first preferred form of the fluid-filled elastic mounting device, the compressive force based on the injection pressure of the synthetic resin of the bracket acts directly on the axial end face of the sealing rubber layer through the inward flange formed at each axial end portion of the generally cylindrical bracket. Further, since the radially inner end of the inward flange is located in alignment with the axial end face of the intermediate sleeve, the mold for forming the bracket may be set in abutting contact with the opposite axial end faces of the intermediate sleeve. This arrangement is effective to prevent formation of burrs at the radially inner portion at the opposite axial ends of the bracket. Further, the inward flanges of the bracket which engage the axial end faces of the intermediate sleeve function to prevent displacement of the bracket relative to the intermediate sleeve in the axial direction, thereby increasing an axial load resistance of the mounting device.

In one advantageous arrangement of the above first preferred form of the fluid-filled elastic mounting device, the intermediate sleeve has an annular shoulder surface at each of opposite axial end portions thereof, and the inward flange of the generally cylindrical bracket has an radially inner end whose diameter is smaller than an inside diameter of the shoulder surface, the inward flange having an annular axial projection which extends from the radially inner end thereof in an axial direction of the generally cylindrical bracket and which engages the shoulder surface.

In the above arrangement wherein the axial projections of the inward flanges of the bracket engage the annular shoulder surfaces at the opposite axial end portions of the intermediate sleeve, the bracket is prevented from being displaced relative to the intermediate sleeve also in the radial direction, so that the sealing rubber layer can be compressed by the above-indicated compressive force with high stability, resulting in increased fluid tightness of the fluid-filled cylindrical elastic mount upon application of a vibrational load thereto. In the present arrangement, the intermediate sleeve is preferably formed of a synthetic resin material, for easier formation of the annular shoulder surfaces at the opposite axial end portions of the intermediate sleeve.

In a second preferred form of the fluid-filled elastic mounting device of the invention, the outer sleeve has an axial length which is smaller than those of the intermediate sleeve and the sealing rubber layer, and the sealing rubber layer has opposite axial end portions whose outer circumferential surfaces are exposed. In this form of the invention, an inner circumferential surface of the cylindrical bore of the bracket are held in direct pressing contact with the outer circumferential surfaces of the opposite axial end portions of the sealing rubber layer by the pressure of injection of the synthetic resin, to apply the compressive force to said sealing rubber layer.

In the above second preferred form of the mounting device, the compressive force based on the injection pressure of the synthetic resin material of the generally cylindrical bracket acts directly on the exposed outer circumferential surfaces of the opposite axial end portions of the sealing rubber layer, whereby the sealing rubber layer can be effectively radially inwardly compressed to improve the fluid tightness of the engine mounting device. A suitable bonding agent may be applied to the exposed outer circumferential surfaces of the axial end portions of the sealing rubber layer, before the bracket is formed, so that the formed bracket is bonded to the exposed surfaces of the sealing rubber layer.

In a third preferred form of the fluid-filled elastic mounting device, the outer sleeve is formed of a synthetic resin material, and is radially inwardly compressed at the outer circumferential surface thereof by the compressive force based on the pressure of injection of the synthetic resin of the bracket, whereby the sealing rubber layer is radially inwardly compressed by the outer sleeve.

In the above third preferred form of the mounting device wherein the compressive force based on the injection pressure of the synthetic resin of the bracket acts indirectly on the sealing rubber layer through the outer sleeve formed of the synthetic resin material, so that the sealing rubber layer is radially inwardly compressed. In other words, the outer sleeve is radially inwardly drawn by the compressive force based on the injection pressure of the synthetic resin of the bracket during formation of the bracket in the mold, so that the sealing rubber layer is compressed between the intermediate and outer sleeves, to assure sufficient fluid tightness of the fluid-filled cylindrical elastic mount.

In a fourth preferred form of the fluid-filled elastic mounting device of this invention, the intermediate sleeve has an axial length larger than those of the outer sleeve and the sealing rubber layer, and opposite axial end portions whose outer circumferential surfaces are exposed, and the inner circumferential surface of the cylindrical bore of the bracket is bonded directly to the outer circumferential surfaces of the opposite axial end portions of the intermediate sleeve.

In the above fourth preferred form of the mounting device, the fluid tightness of the fluid-filled cylindrical elastic mount of the mounting device is further improved owing to a double sealing arrangement, namely, not only the sealing by the sealing rubber layer compressed by the compressive force based on the injection pressure of the synthetic resin material of the bracket, but also the sealing by bonding of the exposed outer circumferential surfaces of the intermediate sleeve to the inner circumferential surface of the bracket.

In one advantageous arrangement of the above fourth preferred form of the mounting device, the intermediate sleeve is formed of a synthetic resin material, and the outer circumferential surfaces of the opposite axial end portions of the intermediate sleeve are subjected to a plasma treatment. In this case, the inner circumferential surface of the cylindrical bore of the the bracket are bonded directly to the outer circumferential surfaces of the opposite axial end portions of the intermediate sleeve upon formation of the bracket in the mold.

The above arrangement assures a sufficient strength of bonding between the intermediate sleeve and the bracket, irrespective of the synthetic resin material of the intermediate sleeve, and without having to use any bonding agent.

In a fifth preferred form of the fluid-filled elastic mounting device of the invention, the outer sleeve is formed of a synthetic resin material, and has a plurality of radial projections which are formed on the outer circumferential surface thereof and which engage the inner circumferential surface of the bracket, so as to prevent displacements of the bracket relative to the outer sleeve.

In the above form of the invention, the radial projections of the outer sleeve are effective to prevent axial or circumferential displacements of the bracket relative to the outer sleeve, resulting in increased load resistance and durability of the mounting device.

The second object indicated above may be achieved according to a second aspect of the present invention, which provides a method of manufacturing a fluid-filled elastic mounting device including a fluid-filled cylindrical elastic mount, and a generally cylindrical bracket which is made of a synthetic resin and which has a cylindrical bore in which the fluid-filled cylindrical elastic mount is fixed, the fluid-filled cylindrical elastic mount comprising a center shaft member, an intermediate sleeve which is disposed radially outwardly of the center shaft member and which has at least one window, an elastic body which is interposed between and connects the center shaft member and the intermediate sleeve and which has at least one pocket open in an outer circumferential surface of the intermediate sleeve through the above-indicated at least one window, and an outer sleeve which is fitted on the intermediate sleeve through a sealing rubber layer interposed therebetween, such that the above-indicated at least one window is fluid-tightly closed by the outer sleeve, so as to form at least one fluid chamber which is filled with a non-compressible fluid and which corresponds to each of the above-indicated at least one pocket, the fluid-filled cylindrical elastic mount being fixedly accommodated in the cylindrical bore of the bracket, with an outer circumferential surface of the outer sleeve being held in contact with an inner circumferential surface of the cylindrical bore, the method being characterised by comprising the steps of: (a) preparing an integral intermediate product wherein the center shaft member and the intermediate sleeve are connected to each other by the elastic body; (b) preparing the fluid-filled cylindrical elastic mount by fitting the outer sleeve on the outer circumferential the intermediate sleeve while filling the above-indicated at least one fluid chamber with the non-compressible fluid; (c) setting the fluid-filled cylindrical elastic mount in a mold such that the outer circumferential surface of the outer sleeve partially defines a cavity for forming the generally cylindrical bracket; and (d) injecting the synthetic resin into the cavity to form the generally cylindrical bracket on the outer circumferential surface of the outer sleeve, such that the outer sleeve is radially inwardly compressed by a compressive force based on a pressure of injection of the synthetic resin into the cavity, to thereby radially inwardly compress the sealing rubber layer, for fluid-tightly closing the above-indicated at least one fluid chamber at the above-indicated at least one window.

In the method of the present invention, the fluid-filled cylindrical elastic mount whose fluid chamber or chambers is/are filled with the non-compressible fluid can be prepared by simply fitting the outer sleeve on the intermediate sleeve of the integral intermediate product, within a mass of the non-compressible fluid. Further, the generally cylindrical bracket is formed within the mold, in pressing contact with the outer sleeve, such that the sealing rubber layer is radially inwardly compressed through the outer sleeve by the compressive force generated based on the pressure of injection of the synthetic resin into the mold. Thus, the present method permits the manufacture of the fluid-filled elastic mounting device having a high degree of fluid tightness, without a cumbersome drawing operation to radially inwardly compress the outer sleeve, which is conventionally performed within the mass of the non-compressible fluid. In other words, the fluid tightness is established upon formation of the bracket in the mold, owing to the pressure of injection of the synthetic resin into the mold.

Accordingly, the present method permits the fluid-filled elastic mounting device to be manufactured with high efficiency and at a reduced cost, while assuring a high degree of fluid tightness of the fluid-filled cylindrical elastic mount.

In one preferred form of the present method of the invention, the step of preparing the fluid-filled cylindrical elastic mount comprises a step of immersing the integral intermediate product in a mass of the non-compressible fluid to fill the above-indicated at least one pocket with the non-compressible fluid, and fitting the outer sleeve on the intermediate sleeve of the integral intermediate product so as to close the above-indicated at least one window.

In another preferred form of the method of the invention which is applied to the mounting device wherein the intermediate sleeve has an axial length larger than those of the outer sleeve and the sealing rubber layer, and opposite axial end portions whose outer circumferential surfaces are exposed, the method further comprises a step of applying a bonding agent to the outer circumferential surfaces of the opposite axial end portions of the intermediate sleeve, before setting the fluid-filled cylindrical elastic mount in the mold, so that the inner circumferential surface of the cylindrical bore of the bracket is bonded directly to the outer circumferential surfaces of the opposite axial end portions of the intermediate sleeve upon formation of the bracket in the mold.

In one advantageous arrangement of the above preferred form of the method, which is applied to the mounting device wherein the intermediate sleeve is formed of a synthetic resin material, the method further comprises a step of subjecting the outer circumferential surfaces of the opposite axial end portions of the intermediate sleeve to a plasma treatment, before setting the fluid-filled cylindrical elastic mount in the mold, so that the inner circumferential surface of the cylindrical bore of the the bracket is bonded directly to the outer circumferential surfaces of the opposite axial end portions of the intermediate sleeve upon formation of the bracket in the mold.

BRIEF DESCRIPTION OF THE DRAWINGS

The above and optional objects, features, advantages and technical and industrial significance of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
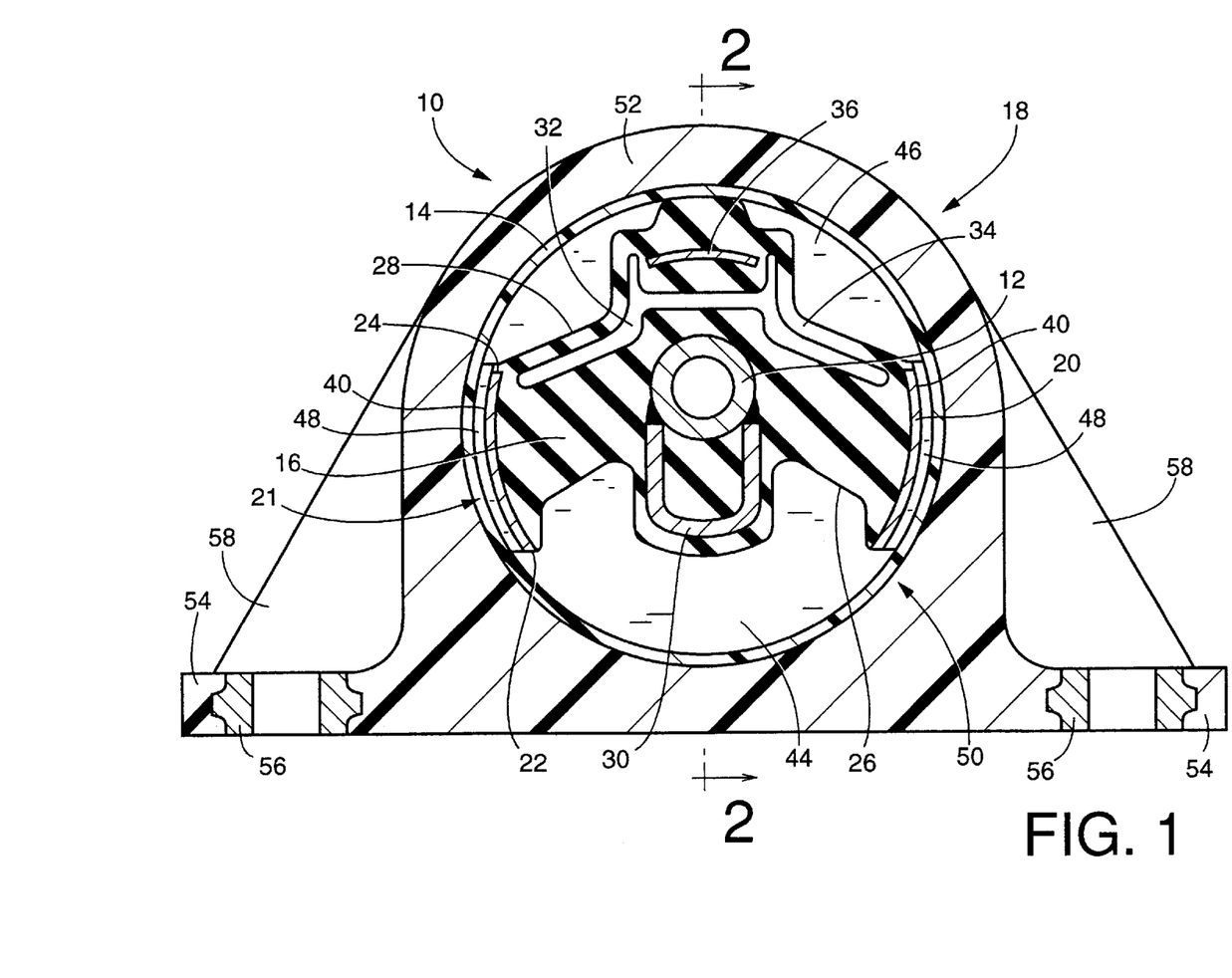
FIG. 1 is an elevational view in transverse cross section of a first embodiment of a fluid-filled elastic mounting device in the form of an engine mounting device.
Figure 2:
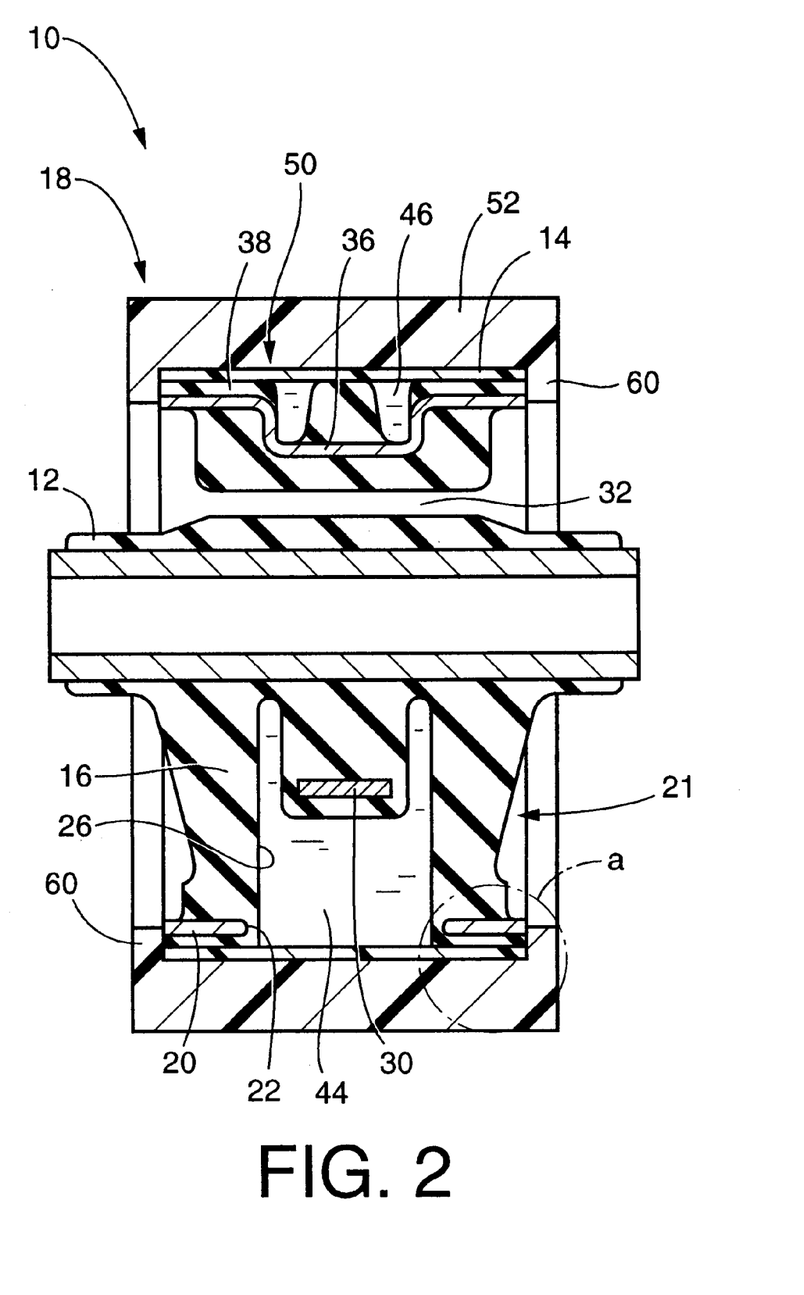
FIG. 2 is a cross sectional view taken along line 2—2 of FIG. 1.

Referring first to FIGS. 1 and 2, there is shown generally at 10 a fluid-filled elastic mounting device for mounting an engine of an automotive vehicle, which is constructed and manufactured according to one embodiment of the present invention. This fluid-filled elastic engine mounting device 10 includes a center shaft member in the form of an inner sleeve 12 made of a metal, an outer sleeve 14 disposed radially outwardly of the inner sleeve 12, and an elastic body 16 made of a rubber material and interposed between the inner and outer sleeves 12, 14 so as to elastically connect these sleeves 12, 14. The elastic engine mounting device 10 further includes a generally cylindrical bracket 18 having a cylindrical bore in which the outer sleeve 14 is fixedly accommodated.

The fluid-filled elastic engine mounting device 10 is interposed between a power unit and a body or frame of the vehicle, such that the inner sleeve 12 is attached to one of the power unit and the body, while the outer sleeve 14 is attached through the bracket 18 to the other of the power unit and the body. Thus, the power unit which includes an engine is installed on the vehicle body in a vibration damping fashion. With the power unit installed on the vehicle body through the engine mounting device 10, the inner and outer sleeves 12, 14 are held in a substantially concentric or coaxial relationship with each other, with elastic deformation of the elastic body 16 on which the weight of the power unit acts in a vertical direction. The engine mounting device 10 is adapted to effectively damp a vibrational load which is applied thereto in a direction substantially parallel to the vertical direction.

Described in detail, the inner sleeve 12 is a cylindrical member having a relatively small diameter. Radially outwardly of the inner sleeve 12, there is disposed an intermediate sleeve 20 which is a cylindrical member having a relatively large diameter and a relatively small wall thickness. Before installation of the fluid-filled elastic engine mounting device 10, the intermediate sleeve 20 has a given amount of eccentricity with respect to the inner sleeve 12. In the present embodiment, the inner and intermediate sleeves 12, 20 are both made of an iron or other metallic material. Between these inner and intermediate sleeves 12, 20, there is formed the elastic body 16 having a generally cylindrical shape and a relatively large wall thickness or radial dimension. The elastic body 16 is formed by vulcanization of a rubber material in a mold in which the inner and intermediate sleeves 12, 20 are suitably positioned relative to each other. In the process of the vulcanization, the elastic body 16 is bonded at its inner circumferential surface to the inner sleeve 12, and at its outer circumferential surface to the intermediate sleeve 20. As a result, the inner and intermediate sleeve 12, 20 and the elastic body 14 constitute an integral intermediate product 21.

The intermediate sleeve 20 of the intermediate product 21 has a first window 22 and a second window 24 formed through respective circumferential portions thereof which are opposed to each other in the direction in which the axes of the inner and intermediate sleeves 12, 20 are offset from each other. The elastic body 16 has a first pocket 26 and a second pocket 28 which are open in the outer circumferential surface of the intermediate sleeve 20 through the first and second windows 22, 24, respectively.

The first pocket 26 is formed in a circumferential portion of the elastic body 16 at which the radial distance between the inner and intermediate sleeves 12, 20 is the largest. That is, the first pocket 26 is formed in the lower circumferential portion of the elastic body 16 (as viewed in FIG. 1) whose radial dimension is larger than that of the upper circumferential portion in which the second pocket 28 is formed. The bottom of the first pocket 26 has a circumferentially central portion in which a first stop member 30 is embedded. The first stop member 30 extends from the inner sleeve 12 in the radially outward direction. On the other hand, the bottom of the second pocket 28 is partially defined by two flexible diaphragms 34, 34, which are easily displaceable or deformable in the presence of a slot 32 which is formed through the elastic body 16 over the entire axial length, as indicated in FIG. 2. The two flexible diaphragms 34, 34 are connected to each other at a circumferentially central portion of the bottom of the second pocket 28, through which a second stop member 36 extends in the axial direction of the intermediate sleeve 20, between the circumferentially opposite edges of the second window 24. The second stop member 36, which is a part of the intermediate sleeve 20, is opposed to the inner sleeve 12 with the slot 32 interposed therebetween, in the radial direction direction of the intermediate sleeve 20.

The outer circumferential surface of the intermediate sleeve 20 is almost entirely covered with a sealing rubber layer 38 having a relatively small thickness. In the present embodiment, the sealing rubber layer 38 is formed integrally with the elastic body 16 in the vulcanization process indicated above.

The intermediate sleeve 20 and the sealing rubber layer 38 cooperate to provide grooves 40, 40 formed axially intermediate portions thereof. These grooves 40, 40 extend in the circumferential directions between the first and second windows 22, 24, and communicate at their ends with the first and second pockets 26, 28.

The outer sleeve 14 indicated above is a cylindrical member having a relatively large diameter and a relatively small thickness. The outer sleeve 14 is fitted on the integral intermediate product 21, more precisely, on the intermediate sleeve 20 through the sealing rubber layer 38 formed on its outer circumferential surface. As a result, the first and second windows 22, 24 of the intermediate sleeve 20 are fluid-tightly closed by the outer sleeve 14, whereby the first and second pockets 26, 28 are fluid-tightly closed to provide a pressure-receiving chamber 44 and an equilibrium chamber 46, respectively. These chambers 44, 46 are filled with a suitable non-compressible fluid. Further, the grooves 44, 46 which are open on the outer circumferential surface of the intermediate product 21 are covered by the outer sleeve 14, whereby the intermediate and outer sleeves 20, 14 and the sealing rubber layer 38 cooperate to define orifice passages 48, 48 corresponding to the grooves 44, 44. The orifice passages 48 communicate with the pressure-receiving and equilibrium chambers 44, 6, and thereby permit fluid communication between these chambers 44, 46. The non-compressible fluid filling the chambers 44, 46 may be selected from among water, alkylene glycol, polyalkylene glycol, and silicone oil. For the engine mounting device 10 to exhibit an improved vibration damping effect based on resonance of the fluid, it is desirable that the fluid have a relatively low viscosity, preferably, not higher than 0.1 Pa·s.

With the outer sleeve 14 fitted on the integral intermediate product 21, there is obtained a fluid-filled cylindrical elastic mount 50 which has the pressure-receiving and equilibrium chambers 44, 46 filled with the non-compressible fluid and which exhibits an intended vibration damping effect on the basis of flows of the fluid between the chambers 44, 46 through the orifice passages 48, 48, when the vibrational load is applied between the inner and outer sleeves 12, 14.

In the present fluid-filled cylindrical elastic mount 50, the outer sleeve 14 is formed of a synthetic resin having a required strength, such as fiber-reinforced polyamide resins. In assembling the outer sleeve 14 and the integral intermediate product 21 which are prepared independently of each other, the intermediate product 21 is immersed in a mass of the selected non-compressible fluid, to fill the first and second pockets 26, 28 with the non-compressible fluid, and the outer sleeve 14 is fitted on the intermediate sleeve 20, to close the first and second windows 22, 24, whereby there is prepared the fluid-filled cylindrical elastic mount 50 wherein the pressure-receiving and equilibrium chambers 44, 46 are filled with the non-compressible fluid. In this respect, it is noted that the inside diameter of the outer sleeve 14 is slightly smaller than the outside diameter of the sealing rubber layer 38 formed on the outer circumferential surface of the intermediate sleeve 20, so that the outer sleeve 14 is held in close contact with the sealing rubber layer 38, so as to fluid-tightly close the first and second windows 22, 24 and the first and second pockets 26, 28, whereby fluid-tightness of the chambers 44, 46 is secured, unless an external force acts on the cylindrical elastic mount 50. For facilitating the fitting of the outer sleeve 14 onto the intermediate sleeve 20, it is effective to taper one of the opposite axial end portions of the outer circumferential surface of the sealing rubber layer 38 and the inner circumferential surface of the outer sleeve 14.

For the thus prepared fluid-filled cylindrical elastic mount 50 to be interposed between the power unit and the body of the vehicle, the cylindrical elastic mount 50 is fixedly accommodated in the cylindrical bore of the generally cylindrical bracket 18, with the outer circumferential surface of the outer sleeve 14 is held in contact with the inner circumferential surface of the cylindrical bore of the bracket 18. The generally cylindrical bracket 18, which is made of a synthetic resin having a required strength, includes a generally cylindrical portion 52 having a relatively large wall thickness, and a pair of planar leg portions 54, 54 which extend in opposite directions from a circumferential portion of the cylindrical portion 52. The leg portions 54, 54 are integral with the cylindrical portion 52, and have metal rings 56 fixed thereto. The cylindrical portion 52 has the cylindrical bore in which the fluid-filled cylindrical elastic mount 50 is accommodated. Suitable fastening means such as bolts or screws are inserted through the metal rings 56 fixed to the leg portions 56, so that the bracket 18 is attached at the leg portions 56 to the power unit or vehicle body. The bracket 18 has reinforcing ribs 58 connecting the cylindrical portion 52 and the planar leg portions 54, 54.

The generally cylindrical bracket 18 is assembled with respect to the cylindrical elastic mount 50, at the same time when the bracket 18 is formed by molding of a suitable synthetic resin material, using a mold in which the cylindrical elastic mount 50 and the metal rings 56 are set. Described in detail, the cylindrical elastic mount 50 is positioned in a central portion of a part of the mold cavity for forming the generally cylindrical portion 52, so that the outer circumferential surface of the outer sleeve 14 functions as a part of the molding surface of the mold. Further, the metal rings 56 are positioned in another part of the mold cavity for forming the planar leg portions 56. The synthetic resin material is injected into the mold cavity, and the generally cylindrical bracket 18 is formed such that the cylindrical portion 52 is formed on the outer circumferential surface of the outer sleeve 14 and such that the metal rings 56 are fixed in the planar leg portions 54. For increasing the bonding strength of the bracket 18 to the outer circumferential surface of the outer sleeve 14 of the cylindrical elastic mount 50, the outer circumferential surface is subjected to a suitable treatment such as application of a bonding adhesive thereto.

During the formation of the generally cylindrical bracket 18, a pressure of injection of the synthetic resin material into the mold cavity acts on the outer circumferential surface of the outer sleeve 14 of the cylindrical elastic mount 50, in the radially inward direction of the outer sleeve 14. As a result, the outer sleeve 14 which is made of the synthetic resin material and which has a relatively small thickness is radially inwardly compressed onto the sealing rubber layer 38, so that the sealing rubber layer 38 is compressed or squeezed between the intermediate and outer sleeves 20, 14, by a compressive force generated based on the injection pressure of the synthetic resin of the bracket 18. Accordingly, the fluid tightness of the pressure-receiving and equilibrium chambers 44, 46 is increased to a value which is sufficient even when an external load such as a vibrational load acts between the inner sleeve 12 and the outer sleeve 14 (bracket 18).

Figure 3:
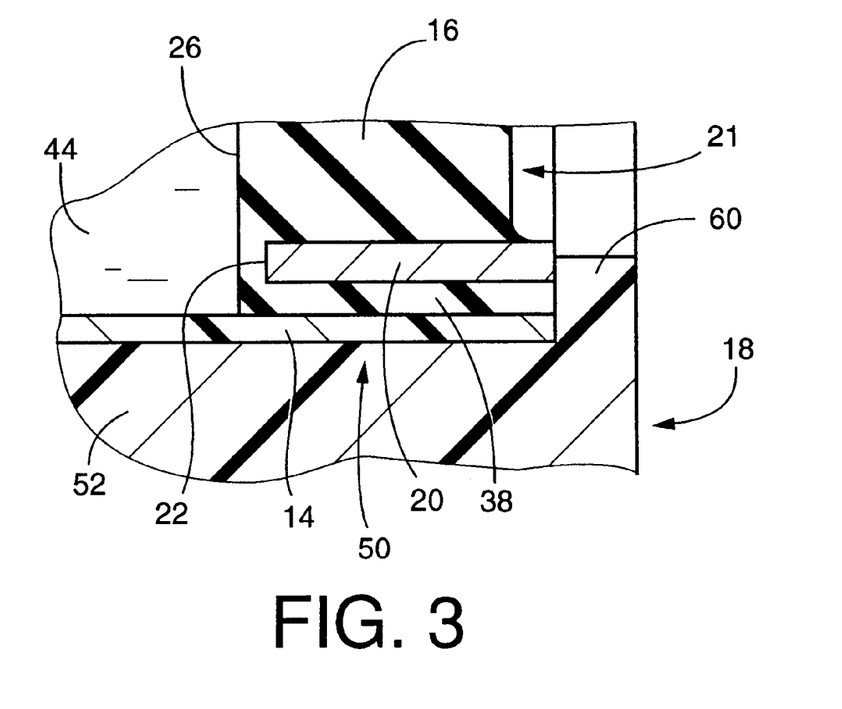
FIG. 3 is an enlarged view showing a portion "a" of the engine mounting device indicated in FIG. 2.

As shown in FIG. 3 as well as FIG. 2, the generally cylindrical bracket 18 has an axial length larger than those of the intermediate and outer sleeves 20, 14. The bracket 18 has an inward flange 60 integrally formed at each of the opposite axial ends of the bracket 18, such that the inward flanges 18 extend from the opposite axial ends of the bracket 18 in the radially inward direction, so as to cover the opposite axial end faces of the outer sleeve 14, and so as to reach the opposite axial end faces of the intermediate sleeve 20. During the molding of the bracket 18, the injection pressure of the synthetic resin material acts on the opposite axis end faces of the sealing rubber layer 28 between the intermediate and outer sleeves 20, 14, whereby these inward flanges 18 formed at the opposite axial ends of the bracket 18 are held in direct pressing contact with the opposite axial end faces of the sealing rubber layer 38.

In the present embodiment, the injection pressure of the resin material indirectly indirectly acts on the outer circumferential surface of the sealing rubber layer 38 through the outer sleeve 14 in the radially inward direction, and directly acts on the opposite axial end faces of the sealing rubber layer 38 in the opposite axially inward directions, in the presence of the inward flanges 60. Accordingly, the sealing rubber layer 38 is effectively compressed so as to increase the fluid tightness between the intermediate and outer sleeves 20, 14.

Since the radially inner ends of the inward flanges 60 of the cylindrical portion 52 of the bracket 18 are located within the thickness of the intermediate sleeve 20, the mold for forming the bracket 18 can be set in abutting contact with the opposite axial end faces of the intermediate sleeve 20, at which the members of the mold are butted together so as to define the mold cavity. This arrangement is effective to prevent formation of burrs at the radially inner portion at the opposite axial ends of the cylindrical portion 52.

The fluid-filled elastic engine mounting device 10 constructed as described above effectively utilizes the compressive force based on the injection pressure of the resin material of the bracket 18 to improve the fluid tightness of the pressure-receiving and equilibrium chambers 44, 46, without using any exclusive member. Conventionally, the outer sleeve of a fluid-filled cylindrical elastic mount is subjected to a cumbersome radially inward drawing operation using a suitable number of dies, for instance, eight dies disposed around the circumference of the outer sleeve, for radially inward compression of the outer sleeve, for increasing the fluid tightness of the fluid chambers. The present method of manufacturing the engine mounting device 10, in particular, the method of forming the generally cylindrical bracket 18, permits the engine mounting device 10 to be manufactured with high efficiency while assuring a satisfactory degree of fluid tightness of the fluid chambers 44, 46, without having to perform the cumbersome drawing operation which is conventionally required.

Further, the inward flanges 60 formed at the opposite axial ends of the bracket 18 are effective to prevent axial displacement of the intermediate and outer sleeves 20, 14 relative to the bracket 18, resulting in an increased load resistance of the engine mounting device 10 in the axial direction.

Figure 4:
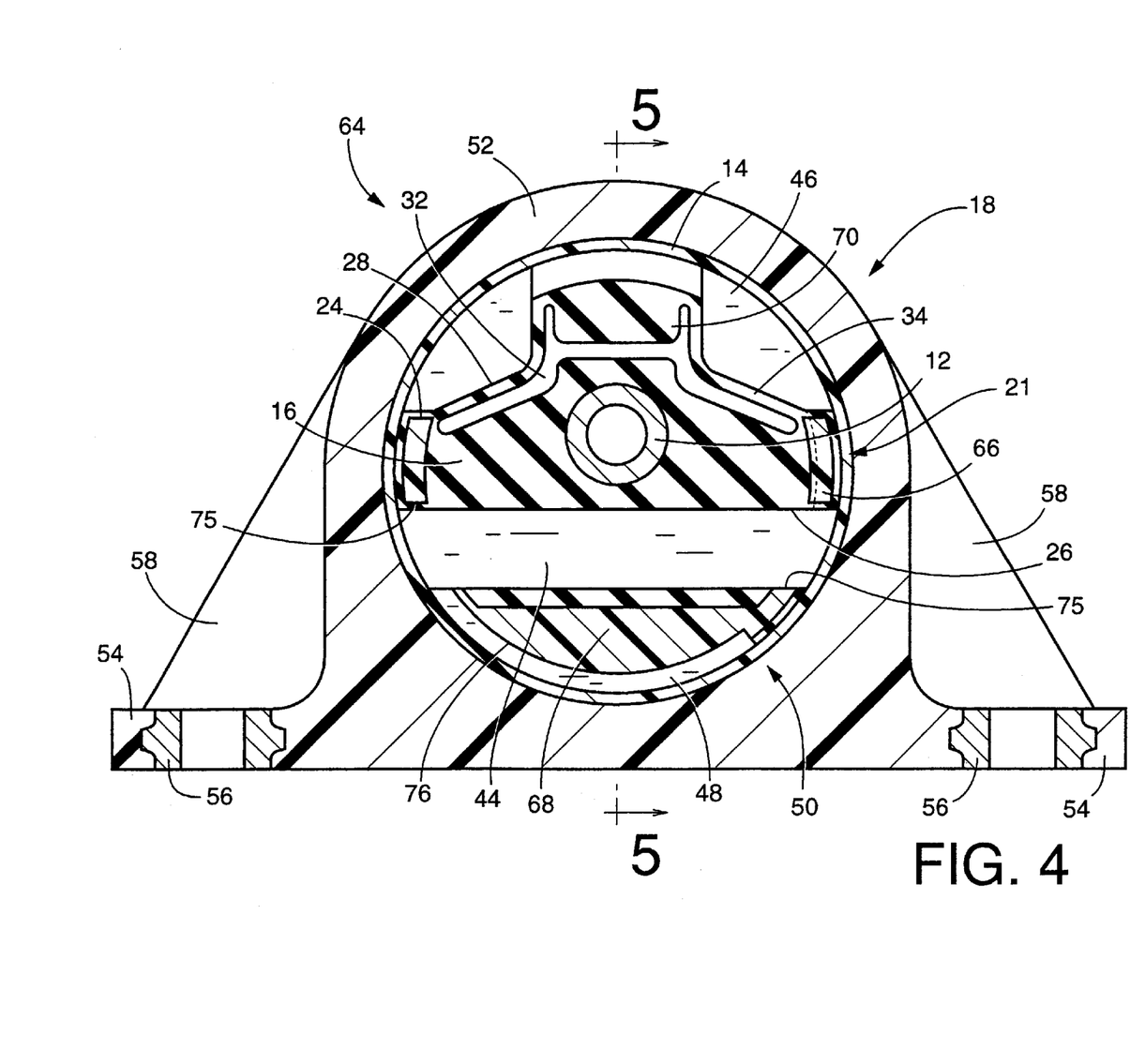
FIG. 4 is an elevational view in transverse cross section of an engine mounting device according to a second embodiment of the invention.
Figure 5:
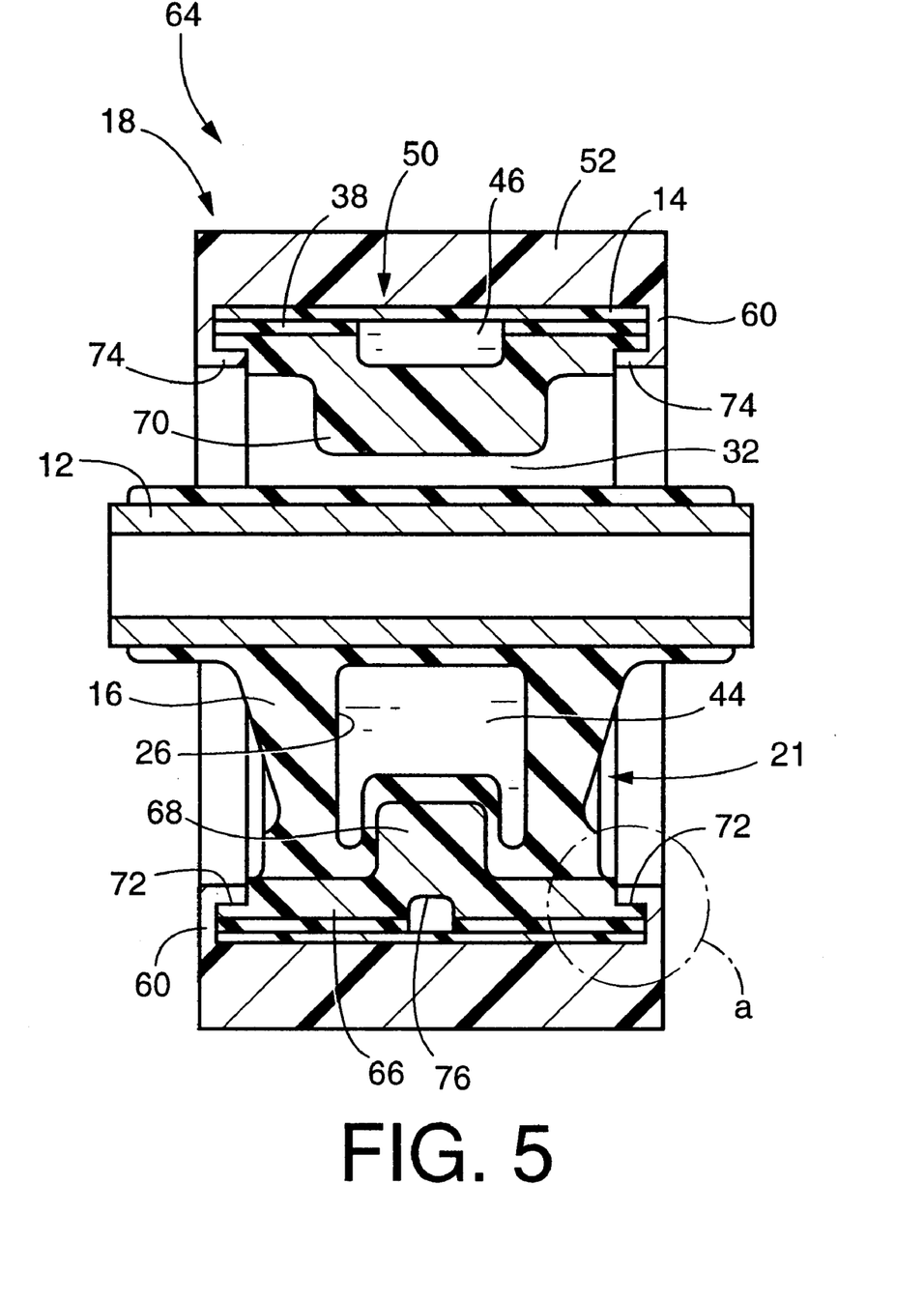
FIG. 5 is a cross sectional view taken along line 5—5 of FIG. 4.
Figure 6:
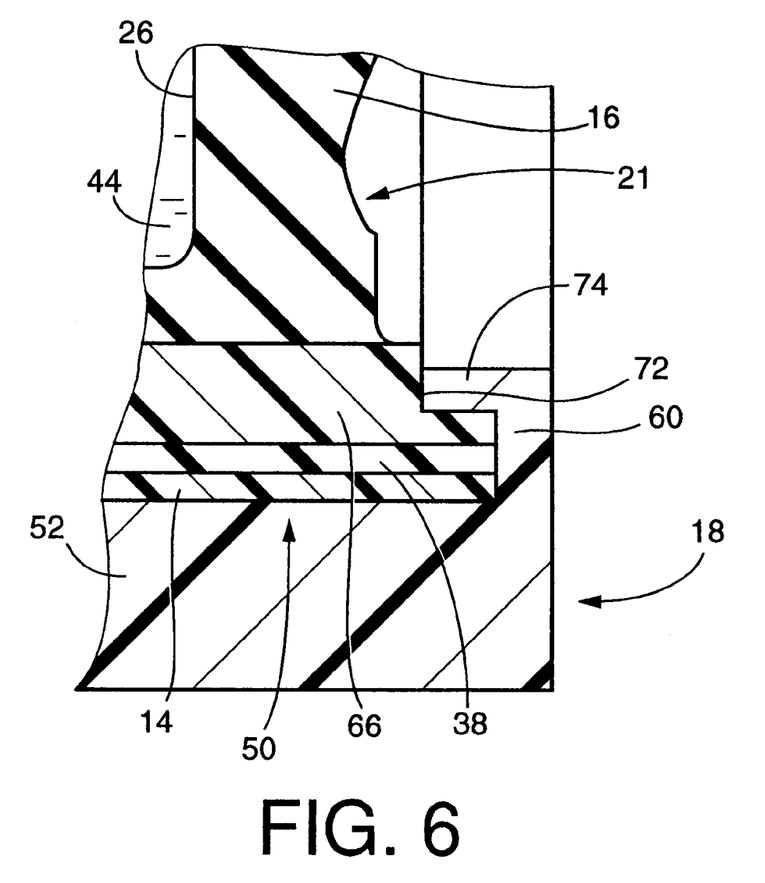
FIG. 6 is an enlarged view showing a portion "a" of the engine mounting device indicated in FIG. 5.

Referring next to FIGS. 4–6, there will be a fluid-filled elastic engine mounting device 64 constructed and manufactured according to a second embodiment of this invention, which is different from the first embodiment, in respect to the intermediate sleeve, in particular. The same reference numerals as used in the first embodiment will be used in this second embodiment, to identify the functionally corresponding or structurally similar elements, which will not be described in detail to avoid redundancy of description.

The engine mounting device 64 according to the present second embodiment uses an intermediate sleeve 66 formed of a suitable synthetic resin material having a required strength, for instance, a fiber-reinforced polyamide resin. As in the first embodiment, the intermediate sleeve 66 is bonded to the outer circumferential surface of the elastic body 16 in the vulcanization process.

Unlike the intermediate sleeve 20 formed of the metallic material in the first embodiment, the intermediate sleeve 66 made of the synthetic resin material has a relatively high degree of freedom of design in its configuration. As most clearly shown in FIG. 5, the intermediate sleeve 66 have axially intermediate thick-walled portions which are opposed to each other in the direction in which the vibrational load is primarily applied to the engine mounting device 64. These two thick-walled portions, which extend toward the inner sleeve 12, function as a first stop portion 68 and a second stop portion 70 which are abuttable onto the inner sleeve 12, for thereby limiting the amount of elastic deformation of the elastic body 16.

The other portions of the intermediate sleeve 66 also have a larger thickness than the intermediate sleeve 20 of the first embodiment, and has an annular shoulder surface 72 at each of the opposite axial end portions, as most clearly shown in FIG. 6. In the presence of the shoulder surfaces 72, the axial length of the intermediate sleeve 66 is smaller at a radially inner portion than at a radially outer portion. Further, the inward flanges 60 formed at the opposite axial ends of the generally cylindrical bracket 18 have the radially inner end faces whose diameter is smaller than the inside diameter of the shoulder surfaces 72. The inward flanges 60 have respective annular axial projections 74 integrally formed so as to extend from the radially inner ends thereof in the opposite axial directions. These axial projections 74 engage the respective annular shoulder surfaces 72.

The intermediate sleeve 66 has a groove 76 formed in its outer circumferential surface in a suitable pattern, for instance, in a helical pattern. With the groove 76 closed by the outer sleeve 14, there is formed the orifice passage 48 for fluid compunction between the pressure-receiving and equilibrium chambers 44, 46. This orifice passage 48 has a larger length than the orifice passages 48 provided in the first embodiment.

In the present engine mounting device 64, the first pocket 26 is formed through the elastic body 16 in a direction perpendicular to the axis of the inner sleeve 12. More specifically described, the first pocket 26 is formed through a lower one (as viewed in FIG. 4) of two portions of the elastic body 16 which are opposed to each other in which the inner and intermediate sleeves 12, 20 are offset in the radial direction. That is, the first pocket 26 is formed through one of the above-indicated two portions of the elastic body 16, whose radial dimension is larger than the other portion. The first pocket 26 is open at its opposite ends in the outer circumferential surface of the intermediate sleeve 66 through a pair of second windows 75, 75 formed therethrough, respectively. As in the first embodiment, the pressure-receiving chamber 44 is formed with the second windows 75, 75 being fluid-tightly closed by the outer sleeve 14.

The engine mounting device 64 constructed as described above provides substantially the same advantages as the engine mounting device 10 of the first embodiment. In addition, the engine mounting device 64 has a higher degree of sealing stability owing to an increased compressive force acting on the sealing rubber layer 38 interposed between the intermediate and outer sleeves 66, 14, in the presence of the annular axial projections 74 of the bracket 18 which engage the shoulder surfaces 72 of the intermediate sleeve 66 and which are effective to prevent the displacement of the bracket 18 relative to the intermediate sleeve 66 not only in the axial direction but also in the radial direction, upon application of the vibrational load to the engine mounting device 64.

Referring to the enlarged views of FIGS. 7–10 corresponding to FIG. 3 of the first embodiment, there will be described further embodiments of this invention wherein the same reference numerals as used in the first embodiment will be used to identify the functionally corresponding or structurally similar elements, which will not be described in detail to avoid redundancy of description.

Figure 7:
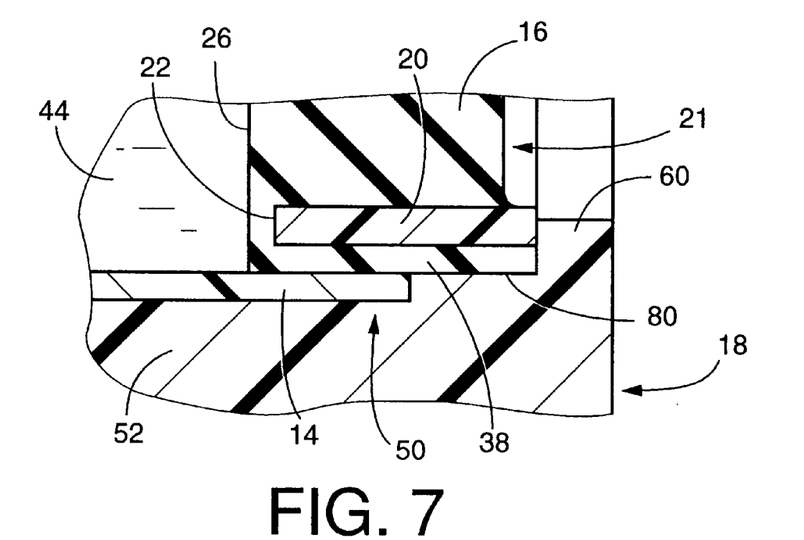
FIG. 7 is an enlarged view showing a portion of an engine mounting device according to a third embodiment of the invention.

In the third embodiment of FIG. 7, the axial length of the outer sleeve 14 is smaller than those of the intermediate sleeve 20 and the sealing rubber layer 38, and the outer circumferential surfaces 80 of the opposite axial end portions of the sealing rubber layer 38 formed on the outer circumferential surface of the intermediate sleeve 20 are exposed over the entire circumference of the intermediate sleeve 20. The inner circumferential surface of the cylindrical bore of the generally cylindrical portion 52 of the bracket 18 are held in direct pressing contact with the exposed outer circumferential surfaces 80 of the sealing rubber layer 38 by the compressive force based on the pressure of injection of the synthetic resin of the bracket 18. Further, the opposite axial end faces of the sealing rubber layer 38 and the intermediate sleeve 20 are held in contact with the inward flanges 60 of the bracket 18. The exposed circumferential surfaces 80 are subjected to a suitable treatment for bonding to the bracket 18, such as application of a bonding agent to the surfaces 80. In this third embodiment, the intermediate sleeve 20 may be formed of either a metallic material or a synthetic resin material.

In the third embodiment of FIG. 7 described above, the compressive force based on the injection pressure of the synthetic resin material of the generally cylindrical bracket 18 acts directly on the outer circumferential surfaces of the opposite axial end portions of the sealing rubber layer 38, whereby the sealing rubber layer 38 can be effectively radially inwardly compressed to improve the fluid tightness of the engine mounting device.

Figure 8:
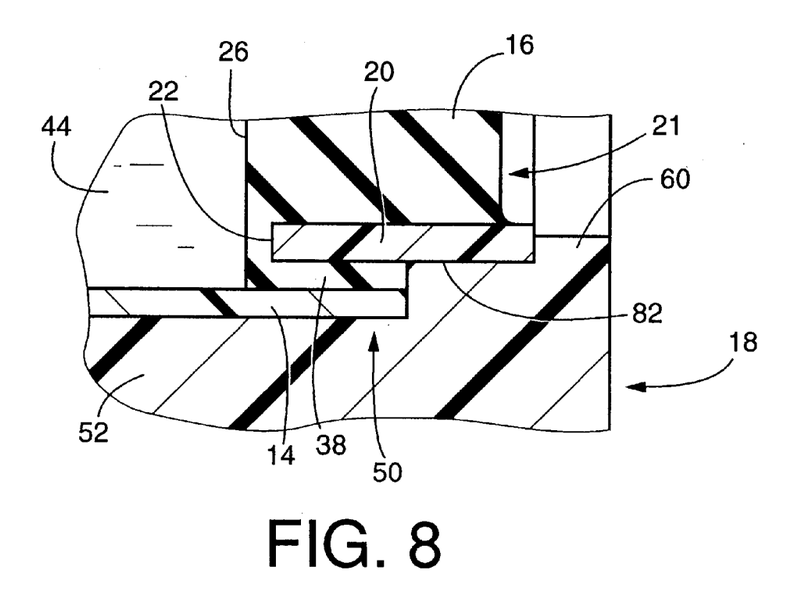
FIG. 8 is an enlarged view showing a portion of an engine mounting device according to a fourth embodiment of the invention.

In the fourth embodiment of FIG. 8, the intermediate sleeve 20 is formed of a synthetic resin material, and the length of the intermediate sleeve 20 is larger than those of the outer sleeve 14 and the sealing rubber layer 38, so that the outer circumferential surfaces 82 of the opposite axial end portions of the intermediate sleeve 20 are exposed over the entire circumference. These exposed outer circumferential surfaces 82 are bonded to the inner circumferential surface of the cylindrical portion 52 of the bracket 18, in direct pressing contact therewith. Further, the opposite axial end faces of the intermediate sleeve 20 are held in contact with the inward flanges 60 of the bracket 18.

For bonding of the bracket 18 to the exposed outer circumferential surfaces 82 of the intermediate sleeve 20, a suitable bonding agent is applied to the exposed surfaces 82 before the bracket 18 is formed, with the axial end portions 82 serving as part of the molding surface of the mold in which the cylindrical elastic mount 50 is set. However, the outer circumferential surfaces 82 may be subjected to a plasma treatment for changing the properties adjacent to the surfaces 82 or for activating the surfaces 82, for increased strength of bonding between the surfaces 82 and the inner circumferential surface of the bracket 18, before the bracket 18 is injection-molded. The plasma treatment permits the desired bonding strength, without application of a bonding agent to the surfaces 82 of the intermediate sleeve 20, and irrespective of the resin material of the intermediate sleeve 20.

In the fourth embodiment of FIG. 8 wherein the outer circumferential surfaces 82 of the opposite axial end portions 82 of the intermediate sleeve 20 are bonded directly to the bracket 18, the fluid tightness of the pressure-receiving and equilibrium chambers 44, 46 is further improved owing to the double sealing arrangement, namely, not only the sealing by the sealing rubber layer 38 compressed between the intermediate and outer sleeves 20, 14 by the compressive force based on the injection pressure of the synthetic resin material of the bracket 18, but also the sealing by bonding of the exposed outer circumferential surfaces 82 of the intermediate sleeve 20 to the bracket 18.

Figure 9:
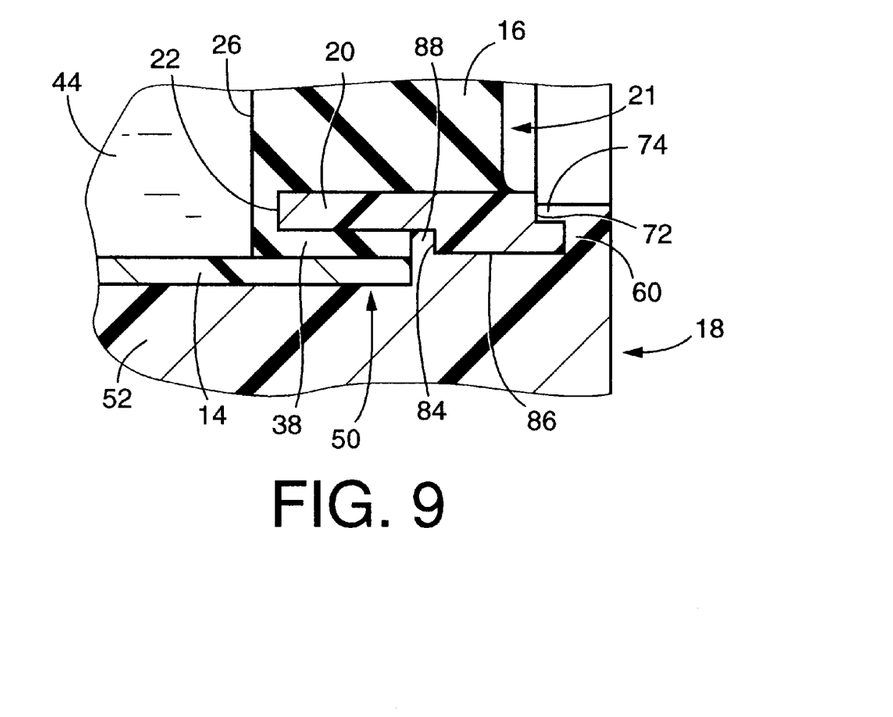
FIG. 9 is an enlarged view showing a portion of an engine mounting device according to a fifth embodiment of the invention.

In the fifth embodiment of FIG. 9, the intermediate sleeve 20 has the shoulder surfaces 72 at the opposite axial end portions, as in the second embodiment of FIGS. 4–6, and the annular axial projections 74 formed integrally with the inward flanges 60 of the bracket 18 engage the shoulder surfaces 74. Further, the intermediate sleeve 20 is thick-walled at its opposite axial end portions so that the axial end portions have a larger outside diameter than the axially intermediate portion, so as to provide annular shoulder surfaces 84 between the axial end portions and the axially intermediate portions. These shoulder surfaces 84 and the outer circumferential surfaces 86 of the axial end portions of the intermediate sleeve 20 are exposed, namely, not covered by the sealing rubber layer 38 or the outer sleeve 14. As in the fourth embodiment of FIG. 8, the cylindrical portion 52 is directly bonded to the shoulder surfaces 84 and the exposed outer circumferential surfaces 86 of the intermediate sleeve 20. In this respect, it is noted that the cylindrical portion 52 has two integrally formed annular radial projections 88 which engage the shoulder surfaces 84 of the intermediate sleeve 20. The intermediate sleeve 20 may be formed of either a metallic material or a synthetic resin material. For easier and economical formation of the intermediate sleeve 20, the synthetic resin material is preferably used.

Like the engine mounting device of FIG. 8, the engine mounting device of FIG. 9 has excellent fluid tightness of the fluid chambers 44, 46 owing to the double-sealing arrangement. In addition, the fifth embodiment of FIG. 9 has an increased load resistance as well as the improved sealing stability, owing to the annular axial projections 74 and the annular radial projections 88 formed on the bracket 18, which engage the shoulder surfaces 72 and the shoulder surfaces 84 of the intermediate sleeve 20, respectively, so as to prevent displacement between the intermediate sleeve 20 and the bracket 18 in the axial and radial directions.

Figure 10:
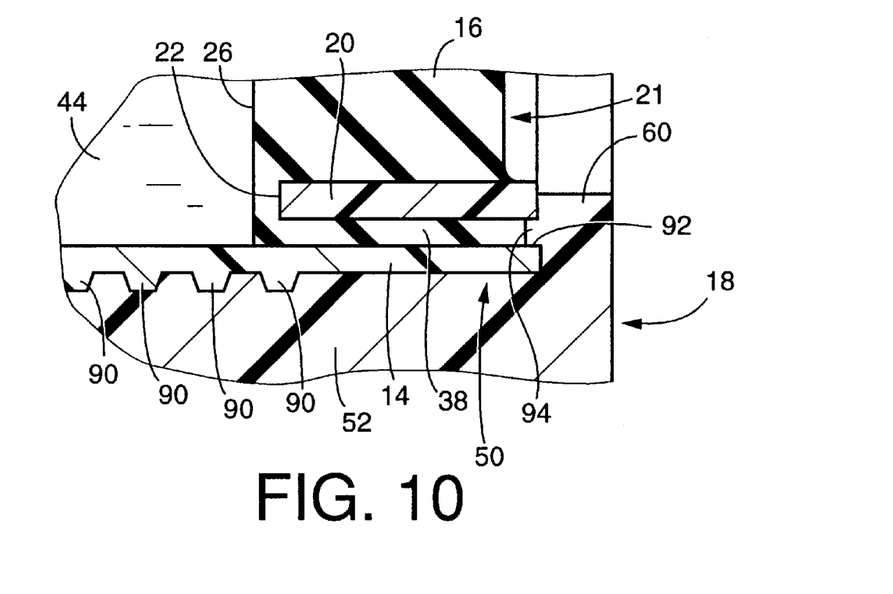
FIG. 10 is an enlarged view showing a portion of an engine mounting device according to a sixth embodiment of the invention.

In the sixth embodiment of FIG. 10, the outer sleeve 14 formed of a synthetic resin material has a plurality of radial protrusions 90 formed on the outer circumferential surface. Each radial protrusion 90 is formed continuously in the circumferential direction of the outer sleeve 14. However, the radial protrusions 90 need not be continuous in the circumferential direction, and may be replaced by a helical protrusion which may or may not be continuous in the circumferential or axial direction of the outer sleeve 14. With the bracket 18 formed on the outer circumferential surface of the outer sleeve 14, the bracket 18 is given a plurality of grooves in the inner circumferential surface, which grooves engage the radial protrusions 90 of the outer sleeve 14.

In the engine mounting device of FIG. 10, the engagement of the radial protrusions 90 with the inner circumferential surface of the bracket 18 prevents relative displacements of the outer sleeve 14 and the bracket 18, and permits firm fixing of the outer sleeve 14 to the bracket 18, and an increased load resistance of the engine mounting device, without a bonding treatment of the outer sleeve 14. It will be understood that the radial protrusions 90 on the outer sleeve 14 and the grooves of the bracket 18 engaging the radial protrusions 90 cooperate to provide a mechanism for preventing the relative displacements of the bracket 18 relative to the outer sleeve 14.

In the sixth embodiment of FIG. 10, the radial protrusions 90 are formed only in an axially intermediate portion of the outer sleeve 14, so that the compressive force based on the injection pressure of the resin material of the bracket 18 effectively acts on the opposite axial end portions of the outer sleeve 14 so as to radially inwardly compress these axial end portions. Further, the opposite axial end faces of the sealing rubber layers 38 are spaced from the corresponding end faces of the intermediate and outer sleeves 20, 14 by a suitable distance in the axially inward directions, so that annular recesses 92 are defined by the opposite axial end portions of the intermediate and outer sleeves 20, 14 and the opposite axial end faces of the sealing rubber layers 38. These annular recesses 92 engage annular axial projections 92 formed integrally of the inward flanges 60 of the bracket 18, so as to prevent displacement of the bracket 18 relative to the intermediate and outer sleeves 20, 14.

While the presently preferred embodiments of this invention have been described above in detail for illustrative purpose only, it is to be understood that the invention is not limited to the details of the illustrated embodiments, but may be otherwise embodied.

For instance, the outer sleeve 14 may be formed of an iron or other metallic material. Where the outer sleeve 14 is formed of a metallic material, the outer sleeve 14 is less likely to be radially inwardly compressed by the injection pressure of the resin material of the bracket 18. However, the compressive force based on the injection pressure may directly act on the opposite axial end faces of the sealing rubber layer 38 through the inward flanges 60 formed integrally with the bracket 18, as in the first embodiment of FIG. 3, or directly act on the exposed outer circumferential surfaces 80 of the opposite axial end portions of the sealing rubber layer 38, as in the third embodiment of FIG. 7, so that the sealing rubber layer 38 is compressed to improve the fluid tightness.

It is also noted that the inward flanges 60 are not essential, provided that the compressive force based on the injection pressure of the resin material of the bracket 18 effectively acts on the sealing rubber layer 38.

While the illustrated fluid-filled elastic mounting devices have the pressure-receiving chamber 44 and the equilibrium chamber 46 which communicate with each other by the orifice passages 48, the principle of the present invention is equally applicable to any fluid-filled elastic mounting device whose fluid chamber or chambers and orifice passage or passages are designed depending upon the required damping characteristics. For instance, the fluid-filled elastic mounting device may have only one fluid chamber, or three or more fluid chambers. Alternatively, the fluid-filled elastic mounting device may be adapted to provide a damping effect using a non-compressible fluid whose viscosity is relatively high.

Further, the generally cylindrical bracket of the mounting device may be suitably modified in construction, depending upon the shape of the member to which the bracket is attached. For example, the leg portions 54 may be eliminated. In this case, the bracket is press-fitted in a mounting hole formed in the above-indicated member.

The fluid-filled elastic mounting device of the present invention may be used as a body mounting device, a differential mounting device and other mounting devices for motor vehicles, other than the engine mounting device, and various mounting devices used in various kinds of equipment.

It is to be understood that the present invention may be embodied with various other changes, modifications and improvements, which may occur to those skilled in the art, without departing from the spirit and scope of the invention defining in the following claims:

What is claimed is:

1. A fluid-filled elastic mounting device including a fluid-filled cylindrical elastic mount, and a generally cylindrical bracket which is made of a synthetic resin and which has a cylindrical bore in which the fluid-filled cylindrical elastic mount is fixedly accommodated in said cylindrical bore, said fluid-filled cylindrical elastic mount comprising:

a center shaft member;

an intermediate sleeve which is disposed radially outwardly of the center shaft member and which has at least one window;

an elastic body which is interposed between and connects the center shaft member and the intermediate sleeve and which has at least one pocket open in an outer circumferential surface of said intermediate sleeve through said at least one window; and an outer sleeve which is fitted on the intermediate sleeve through a sealing rubber layer interposed therebetween, such that said at least one window is fluid-tightly closed by said outer sleeve, so as to form at least one fluid chamber which is filled with a non-compressible fluid and which corresponds to each of said at least one pocket, and wherein said sealing rubber layer is compressed by a compressive force which is generated based on a pressure of injection of said synthetic resin of said generally cylindrical bracket into a mold when said generally cylindrical bracket is formed in said mold, in contact with an outer circumferential surface of said outer sleeve, and is thereby fitted on said fluid-filled cylindrical elastic mount upon formation of said generally cylindrical bracket in said mold.

2. A fluid-filled elastic mounting device according to claim 1, wherein said generally cylindrical bracket includes an inward flange integrally formed at each of opposite axial end portions thereof, said inward flange extending from said each axial end portion in a radially inward direction of said generally cylindrical bracket, and reaching an axial end face of said intermediate sleeve, said inward flange being held in pressing contact with an axial end face of said sealing rubber layer by said pressure of injection of said synthetic resin, to apply said compressive force to said sealing rubber layer.

3. A fluid-filled elastic mounting device according to claim 2, wherein said intermediate sleeve has an annular shoulder surface at each of opposite axial end portions thereof, and said inward flange of said generally cylindrical bracket has a radially inner end whose diameter is smaller than an inside diameter of said shoulder surface, said inward flange having an annular axial projection which extends from said radially inner end thereof in an axial direction of said generally cylindrical bracket and which engages said shoulder surface.

4. A fluid-filled elastic mounting device according to claim 1, wherein said outer sleeve has an axial length which is smaller than those of said intermediate sleeve and said sealing rubber layer, and said sealing rubber layer has opposite axial end portions whose outer circumferential surfaces are exposed, an inner circumferential surface of said cylindrical bore of said bracket being held in direct pressing contact with said outer circumferential surfaces of said opposite axial end portions of said sealing rubber layer by said pressure of injection of said synthetic resin, to apply said compressive force to said sealing rubber layer.

5. A fluid-filled elastic mounting device according to claim 1, wherein said outer sleeve is formed of a synthetic resin material, and is radially inwardly compressed at said outer circumferential surface thereof by said compressive force based on said pressure of injection of the synthetic resin of said bracket, whereby said sealing rubber layer is radially inwardly compressed by said outer sleeve.

6. A fluid-filled elastic mounting device according to claim 1, wherein said intermediate sleeve has an axial length larger than those of said outer sleeve and said sealing rubber layer, and opposite axial end portions whose outer circumferential surfaces are exposed, and an inner circumferential surface of said cylindrical bore of said bracket is bonded directly to said outer circumferential surfaces of said opposite axial end portions of said intermediate sleeve upon formation of said bracket in said mold.

7. A fluid-filled elastic mounting device according to claim 6, wherein said intermediate sleeve is formed of a synthetic resin material, and said outer circumferential surfaces of said opposite axial end portions of said intermediate sleeve are subjected to a plasma treatment, said inner circumferential surface of said cylindrical bore of said said bracket being bonded directly to said outer circumferential surfaces of said opposite axial end portions of said intermediate sleeve upon formation of said bracket in said mold.

8. A fluid-filled elastic mounting device according to claim 1, wherein said outer sleeve is formed of a synthetic resin material, and has a plurality of radial projections which are formed on said outer circumferential surface thereof and which engage an inner circumferential surface of said cylindrical bore of said bracket, so as to prevent displacements of said bracket relative to said outer sleeve.

9. A method of manufacturing a fluid-filled elastic mounting device including a fluid-filled cylindrical elastic mount, and a generally cylindrical bracket which is made of a synthetic resin and which has a cylindrical bore in which the fluid-filled cylindrical elastic mount is fixed, said fluid-filled cylindrical elastic mount comprising a center shaft member, an intermediate sleeve which is disposed radially outwardly of the center shaft member and which has at least one window, an elastic body which is interposed between and connects the center shaft member and the intermediate sleeve and which has at least one pocket open in an outer circumferential surface of said intermediate sleeve through said at least one window, and an outer sleeve which is fitted on the intermediate sleeve through a sealing rubber layer interposed therebetween, such that said at least one window is fluid-tightly closed by said outer sleeve, so as to form at least one fluid chamber which is filled with a non-compressible fluid and which corresponds to each of said at least one pocket, said fluid-filled cylindrical elastic mount being fixedly accommodated in said cylindrical bore of said bracket, with an outer circumferential surface of said outer sleeve being held in contact with an inner circumferential surface of said cylindrical bore, said method being characterised by comprising the steps of:

preparing an integral intermediate product wherein said center shaft member and said intermediate sleeve are connected to each other by said elastic body;

preparing said fluid-filled cylindrical elastic mount by fitting said outer sleeve on said outer circumferential said intermediate sleeve while filling said at least one fluid chamber with said non-compressible fluid;

setting said fluid-filled cylindrical elastic mount in a mold such that said outer circumferential surface of said outer sleeve partially defines a cavity for forming said generally cylindrical bracket; and injecting said synthetic resin into said cavity to form said generally cylindrical bracket on said outer circumferential surface of said outer sleeve, such that said outer sleeve is radially inwardly compressed by a compressive force based on a pressure of injection of said synthetic resin into said cavity, to thereby radially inwardly compress said sealing rubber layer, for fluid-tightly closing said at least one fluid chamber at said at least one window.

10. A method according to claim 9, wherein said step of preparing said fluid-filled cylindrical elastic mount comprises immersing said integral intermediate product in a mass of said non-compressible fluid to fill said at least one pocket with said non-compressible fluid, and fitting said outer sleeve on said intermediate sleeve of said integral intermediate product so as to close said at least one window.

11. A method according to claim 9, wherein said intermediate sleeve has an axial length larger than those of said outer sleeve and said sealing rubber layer, and opposite axial end portions whose outer circumferential surfaces are exposed, said method further comprising a step of applying a bonding agent to said outer circumferential surfaces of said opposite axial end portions of said intermediate sleeve, before setting said fluid-filled cylindrical elastic mount in said mold, so that said inner circumferential surface of said cylindrical bore of said bracket is bonded directly to said outer circumferential surfaces of said opposite axial end portions of said intermediate sleeve upon formation of said bracket in said mold.

12. A method according to claim 11, wherein said intermediate sleeve is formed of a synthetic resin material, and said method further comprising a step of subjecting said outer circumferential surfaces of said opposite axial end portions of said intermediate sleeve to a plasma treatment, before setting said fluid-filled cylindrical elastic mount in said mold, so that said inner circumferential surface of said cylindrical bore of said said bracket is bonded directly to said outer circumferential surfaces of said opposite axial end portions of said intermediate sleeve upon formation of said bracket in said mold.

* * * * *